UNITED STATES PATENT OFFICE.

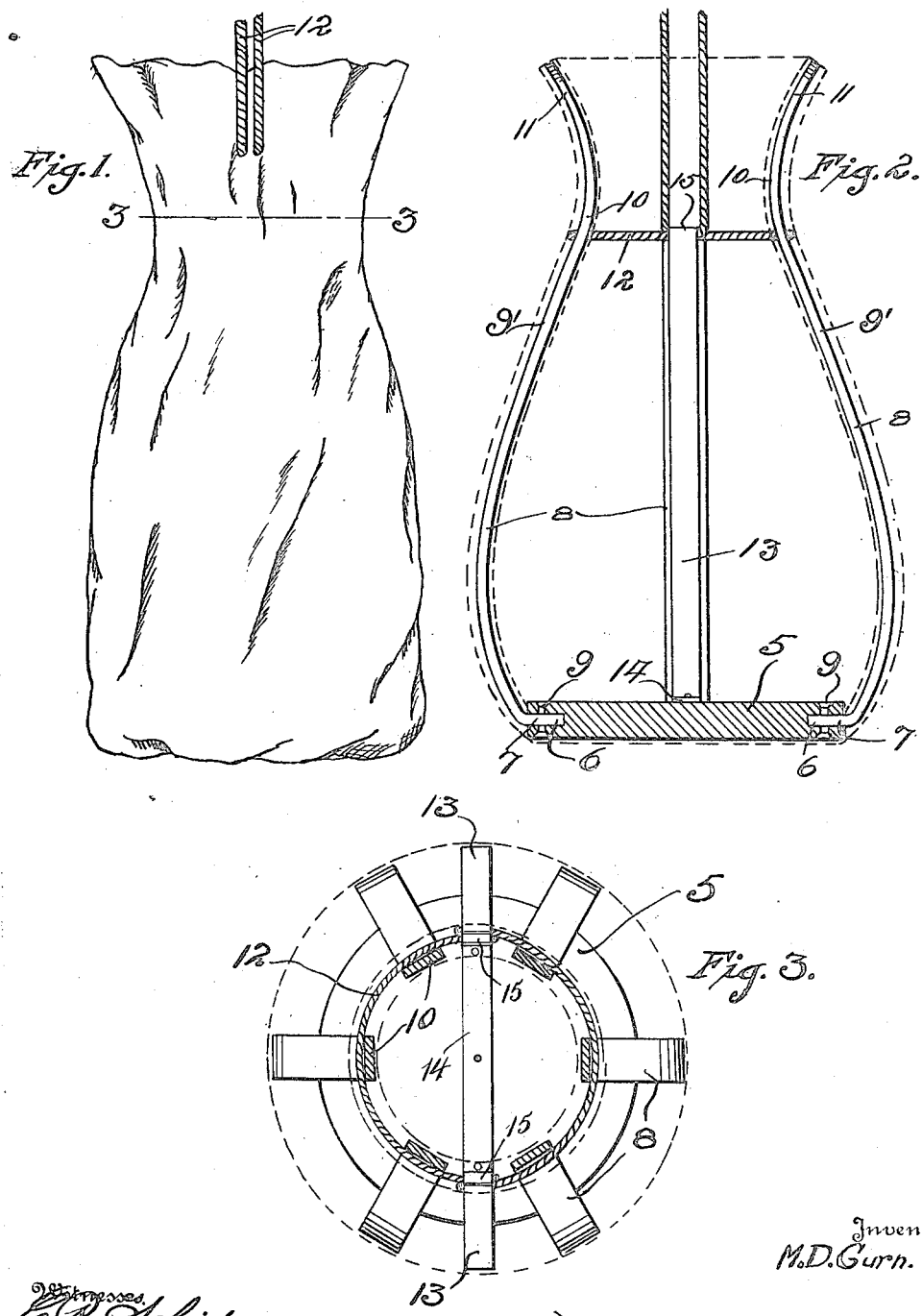

MICHAEL D. GURN, OF BRIDGEPORT, CONNECTICUT.

FEED-BAG HOLDER.

1,253,815.  Specification of Letters Patent.  Patented Jan. 15, 1918.

Application filed April 23, 1917.   Serial No. 163,913.

*To all whom it may concern:*

Be it known that I, MICHAEL D. GURN, a subject of the King of Great Britain, residing at Bridgeport, in the county of Fairfield, State of Connecticut, have invented certain new and useful Improvements in Feed-Bag Holders; and I do hereby declare the following to be a full, clear, and exact description of the invention, such as will enable others skilled in the art to which it appertains to make and use the same.

This invention is an improvement in animal feed bags and has particular reference to a holder or support therefor.

An object of the invention is the provision of a holder for the bag which will prevent spilling of the feed therefrom when the animal withdraws his head from the bag, and, to this end, use is made of a plurality of resilient arms carried by a base and engaging the bag in such a manner as to restrict the size of the opening thereof when the animal is not feeding therefrom.

Another object is the provision of a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of the holder or support constructed in accordance with the invention and shown in open position.

Fig. 2 is a vertical sectional view thereof.

Fig. 3 is a transverse section on the line 3—3 of Fig. 1.

The invention is illustrated in the accompanying drawing in what is now believed to be its preferred form and comprises a circular base 5 for supporting the bottom of the feed bag shown in dotted lines and provided in its periphery with a plurality of sockets 6, preferably six in number, each of which is adapted to receive the lower end 7 of a resilient arm 8, said arms forming the sides of the holder. The lower ends of the arms 8 are secured in the sockets 6 by rivets 9 or otherwise and said arms are each extended upwardly and curved or bent inwardly toward each other as indicated at 9' to provide a substantially circular and restricted neck portion 10. When the holder is not in use or, in other words, when the animal is not feeding from the bag in the holder, the neck portions 10 are in close proximity to each other and virtually close the opening in the feed bag so that spilling of the contents will be prevented. The upper ends of the arms 8 are flared outwardly as indicated at 11 so as to permit of the easy insertion of the animal's head into the bag whereupon the free ends of said arms, including the neck portions 10, will be forced outwardly.

In order to further contract the neck portion and provide means to suspend the bag the arms 8 are preferably encircled by a flexible cord 12, at the neck portions 10 thereof. A reinforcing and supporting strap 13 has its intermediate portion 14 secured to the inner surface of the base 5 and extends diametrically thereacross. The ends of said strap are extended upwardly from the edges of the base 5 and are provided at their upper end with loops 15 through which the cord 12 extends.

What is claimed is:—

1. A feed bag holder comprising a base, a plurality of resilient arms rigidly secured to said base and extending therefrom in spaced relation and having inwardly bowed portions near their free ends to form a normally restricted neck, a cord encircling said neck for further contracting the same, and a reinforcing and supporting strap having its intermediate portions secured to said base and its ends provided with loops through which said cord extends.

2. A feed bag holder comprising a base, a plurality of resilient arms secured to said base and having inwardly bowed portions adjacent their free ends to form a restricted neck, a cord encircling said neck for further contracting the same, and a reinforcing and supporting strap having a portion thereof secured to said base and its ends provided with loops through which said cord extends.

In testimony whereof, I affix my signature in the presence of two witnesses.

MICHAEL D. GURN.

Witnesses:
 MICHAEL COYNE,
 FRANK COREY.

Copies of this patent may be obtained for five cents each, by addressing the "Commissioner of Patents, Washington, D. C."